UNITED STATES PATENT OFFICE.

CHARLES SIEDHOF, OF UNION, NEW JERSEY.

FUEL COMPOUND.

SPECIFICATION forming part of Letters Patent No. 345,329, dated July 13, 1886.

Application filed April 22, 1886. Serial No. 199,798. (No specimens.)

*To all whom it may concern:*

Be it known that I, CHARLES SIEDHOF, a citizen of the United States, residing at Union, in the county of Hudson and State of New Jersey, have invented a new and useful Improvement in Fuel Compounds, of which the following is a specification.

My invention relates to a fuel compound; and it consists of the several ingredients compounded in the manner and proportions hereinafter specified and pointed out.

The object of my invention is to provide a fuel compound that is to be used as a substitute for coal, gas, and other like heating agents for domestic and other purposes, which shall emit a very great and intense heat and burns with very little draft and without flame or smoke.

My improved compound consists of the following ingredients in substantially the proportions stated, to wit: finely powdered or pulverized charcoal, anthracite, or coke, one (1) pound; starch or rye-flour, one (1) ounce; sugar or acetate of lead, two and one-half (2½) drams; chlorate of potash, five (5) grains; nitrate of lead, ten (10) grains; glycerine, one (1) dram; alcohol, one (1) dram, and water in sufficient quantity to reduce the mass to a plastic state.

The method of compounding the ingredients is as follows: The charcoal, anthracite, or coke is first finely pulverized or powdered and bolted by any suitable means or devices. A thin paste of the starch or rye-flour is then made by the admixture therewith of a little hot water, and this paste is then divided into two equal parts. The sugar of lead, chlorate of potash, and nitrate of lead, in the proportions above specified, are then dissolved in a little hot water, each of the ingredients being dissolved in separate vessels and water, just sufficient quantity being used to effect the dissolution. These latter-mentioned ingredients—*i. e.*, sugar of lead, chlorate of potash, and nitrate of lead—are then intimately mixed with one of the two parts of the paste of starch or rye-flour, and this mixture is then heated, but not to the boiling-point. After the mixture has been heated for a sufficient length of time it is poured into the vessel that contains the powdered charcoal, anthracite, or coke, and the glycerine and alcohol are then added to the compound, the whole of which is then pounded and mixed until they are intimately and thoroughly mixed and commingled together, as much of the paste of starch or rye-flour, in a hot state, being added as is necessary to make the mass plastic and pliable, and easily formed into cakes of any desired form or size. After the cakes have been formed, which is preferably accomplished in a mold of suitable shape, they are pressed very firmly in any suitable apparatus and subjected to a gentle heat until they are thoroughly dried. The mass or cake is in condition for use when its outer surface assumes a glossy appearance that closely resembles a japanned surface, and the cakes or mass can be burned on a table, or in a stove, or any other place, either for domestic purposes or any other uses to which it can be applied.

I have found by experiments that my improved compound, hereinbefore fully described, burns with a very slight draft and without smoke or flame, and it emits or radiates a very great volume of heat. The mass or cake can be ignited by merely applying a lighted match thereto, and extinguished by pouring water thereon.

My improved fuel compound is especially valuable in those arts where it is desirable to have a very great heat—as, for instance, in tinner's use for heating soldering-irons—and where the fuel is to be carried without any inconvenience to the workman; but I would have it understood that I do not confine myself to the use of my invention in any particular art.

Having thus fully described my invention, what I claim as new, and desire to secure by Letters Patent, is—

1. The herein-described fuel compound, consisting of charcoal, anthracite, or coke, starch or rye-flour, sugar of lead, chlorate of potash, nitrate of lead, glycerine, and alcohol, in substantially the proportions specified.

2. As a new article of manufacture, a compressed fuel consisting of anthracite, charcoal, or coke, starch, sugar of lead, chlorate of potash, nitrate of lead, glycerine, and alcohol and water, the whole mixed and thoroughly commingled together and subjected to heat and pressure to form it into a compact mass, substantially as described.

In testimony that I claim the foregoing as my own I have hereto affixed my signature in presence of two witnesses.

CHARLES SIEDHOF.

Witnesses:
THOS. HENRY,
FREDK. C. HANSEN.